INVENTOR

CHARLES GEORGE NEUROTH

BY Marion D. Ford

ATTORNEY

United States Patent Office

3,560,244
Patented Feb. 2, 1971

1

3,560,244
METHOD FOR BONDING CURABLE MODIFIED ORGANOPOLYSILOXANES TO A SUBSTRATE AND ARTICLE PRODUCED THEREBY
Charles G. Neuroth, Blissfield, Mich., assignor to Stauffer Chemical Company, New York, N.Y., a corporation of Delaware
Filed Mar. 14, 1968, Ser. No. 713,142
Int. Cl. B44d 1/14; B32b 15/08
U.S. Cl. 117—71                                14 Claims

ABSTRACT OF THE DISCLOSURE

A method for bonding a room-temperature-curable modified organopolysiloxane to a substrate which comprises applying a zinc dust primer composition to the substrate, coating the dried primer composition with a curable organopolysiloxane and thereafter applying a curable modified organopolysiloxane to the organopolysiloxane coated substrate.

---

This invention relates to a modified silicone rubber coated substrate, particularly to a composition for bonding room-temperature-curable modified silicone rubber to a substrate and more particularly to a method for bonding a room-temperature-curable modified silicone rubber to a metal substrate.

Heretofore, silicone rubber was a well known product which has excellent properties such as thermal stability, dielectric properties, resistance to atmospheric deterioration, chemical inertness, non-toxicity and retention of properties over extreme temperature ranges. The wide variety of uses for silicone rubber has inevitably led to a search for methods for anchoring or bonding silicone rubber to solid substrates in order to obtain the benefit of these desirable properties. The use of various primers, cements and other intermediate adhesive layers between silicone rubber and base materials has been proposed. Some of the methods are quite effective for bonding silicone rubber to some base materials where heat is employed, yet are ineffective for bonding room-temperature-curable silicone rubber to these base materials. Other methods have a certain degree of bonding of room-temperature-curable silicone rubber but introduce undesirable characteristics such as thermal instability and corrosion.

Also, when room-temperature-curable silicone rubber cures, a by-product results which will often cause corrosion between the rubber and the metal substrate, thereby destroying any bonds between the rubber and the substrate.

It is therefore an object of this invention to provide a suitable primer for solid substrates. Another object of this invention is to provide a simple method for bonding a room-temperature-curable modified silicone rubber to a solid substrate. Still another object of this invention is to provide a method of obtaining a strong, durable bond between room-temperature-curable modified silicone rubber and a metal substrate. A further object of this invention is to provide a metal substrate which is noncorrosive to the by-products formed during the curing of room-temperature-curable silicone rubber. A still further object of this invention is to provide a method for bonding a modified silicone rubber to a metal substrate in the absence of heat.

2

The foregoing objects and others which will become apparent from the following description are accomplished in accordance with this invention, generally speaking, by providing a method for bonding room-temperature-curable modified silicone rubber to metal substrates.

More specifically, this invention relates to a method for bonding room-temperature-curable modified silicone rubber to a metal substrate which comprises depositing on the solid substrate a zinc dust primer composition consisting of a pre-condensed tetraalkoxysilane having a silica content upwards of 35 percent, water in an amount to provide from 0.15 to 0.5 mole of $H_2O$ for each alkoxy group present in the tetraalkoxysilane condensate, a solvent and zinc primer, drying the coated substrate at a temperature sufficient to cure the coating, applying an organopolysiloxane composition which is curable at ambient moisture to the coated substrate and thereafter applying an overcoat of a room-temperature-curable modified organopolysiloxane to the intermediate layer of organopolysiloxane.

By way of illustrating the present invention, reference may be had to the drawings in which.

Figure 1:
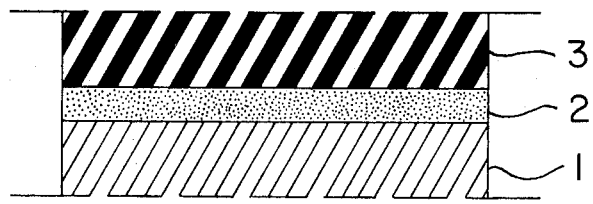
FIG. 1 is a side elevational view illustrating a curable organopolysiloxane assembly having a zinc layer interspersed between the curable organopolysiloxane and the substrate.

The primer composition is based on a tetraalkoxysilane of the formula:

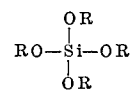

wherein R is a lower alkyl radical of not more than 4 carbon atoms, i.e. methyl, ethyl, propyl, isopropyl, butyl and isobutyl.

Before the tetraalkoxysilane can be used in this invention, it must be pre-hydrolyzed and condensed to an extent such that the $SiO_2$ content of the condensate is at least 35 percent on a molecular weight basis. Especially good results have been obtained where the condensate contains up to about 40 percent $SiO_2$.

The tetraalkoxysilane may be prepared by reacting silicon tetrachloride with an alcohol, preferably in the presence of sufficient water to achieve the desired $SiO_2$ content in the product. Since the initial siloxane product does not contain the necessary amount of silica ($SiO_2$), an additional increment of water based on the desired silica content is added and the reaction allowed to continue under controlled conditions. Using the proper amount of water, the reaction which is one of further condensation is self-perpetuating. Thus, hydrolysis and condensation continue until the reaction is stopped by a known means or until a material is produced which is non-hydrolyzable under the particular condition.

In general, it is preferred to employ in the formation of the primer composition a condensate based on tetraethoxysilane, i.e. a condensate of tetraethyl orthosilicate, and as previously indicated particularly excellent results have been achieved where the tetraethoxysilane condensate has an $SiO_2$ content of the order of 40 percent based on the molecular weight.

The primer composition is then prepared by mixing the tetraalkoxysilane condensate of the selected $SiO_2$ content with additional water and an alkylene glycol alkyl ether sovent such as monoalkylene glycol monalkyl ethers, dialkylene glycol monoalkyl ethers, dialkylene glycol dialkyl ethers and monoalkylene glycol dialkyl ethers which are miscible with water which have boiling points within the range of from 121° C. to 150° C. and flash points within the range of from 46° C. to about 74° C.

In preparing the primer composition, the water which is added to the tetraalkoxysilane condensate and the solvent should contain acid in an amount sufficient to give the mixture a pH of the range of about 1.4 to 3.5. Hydrochloric acid is generally used but other mineral acids such as sulfuric acid may be used either alone or in combination with hydrochloric acid. Also, organic acids which possess the required strength as well as metal chlorides, nitrates and sulfates where the metal is a member of Groups III or IV of the Periodic Table may be used. The purpose of the acid is to catalyze or further hydrolyze the pre-condensed tetraalkoxysilane. The degree of further hydrolysis of the tetraalkoxysilane condensate resulting from the addition of acidified water to the solvent mixture may lie within the range of 0.15 mole to 0.5 mole of water per each alkoxy group carried by the tetraalkoxysilane condensate.

The solvent to condensate ratio is not critical and subject to a wide variation depending upon the characteristics desired in the coating composition. Thus, the ratio of solvent to condensate may lie any where within the limits of from 0.5:1 to 10:1.

The amount of zinc dust may vary over a wide range, i.e. from about 10 to 90 percent based on the weight of the composition. Excellent results have been obtained where the zinc has been used in an amount of from about 10 to 50 percent based on the weight of the composition.

The primer composition is applied to a metal surface as by spraying, dipping, brushing, wiping and the like, and cured at any temperature of from about 50° C. up to about 450° C. Where higher temperatures are used, the cure may be effected in about 10 seconds, while lower temperatures may require relatively longer curing times.

An organopolysiloxane which is curable at ambient moisture is then applied to the coated substrate. This provides the structure illustrated in FIG. 1 where 1 is a substrate, 2 is a zinc dust primer and 3 is the curable organopolysiloxane. The room-temperature-curable silicone rubbers are compositions comprising organopolysiloxanes having functional groups, most of which are attached to terminal silicon atoms. Organopolysiloxanes preferably hydroxyl-terminated organopolysiloxanes, which may be used are represented by the formula:

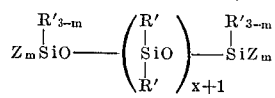

wherein R′, which may be the same or different, are monovalent hydrocarbon radicals, halogenated monovalent hydrocarbon radicals, cyanolkyl radicals; Z represents hydroxyl or hydrolyzable groups; m is an integer of from 1 to 3 and x is an integer of from 0 to 20,000.

The modified organopolysiloxanes which are applied to the conventional curable organopolysiloxane layer may be represented by the formula:

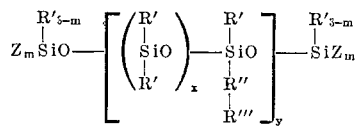

wherein R′, Z m and x are the same as those described above; R″ is a divalent hydrocarbon radical; R‴ is a polymeric organic radical linked to R″ by a carbon-to-carbon linkage and y is an integer of from 1 to 500.

As mentioned heretofore, Z represents hydroxyl and groups hydroylzable in ambient moisture such as:

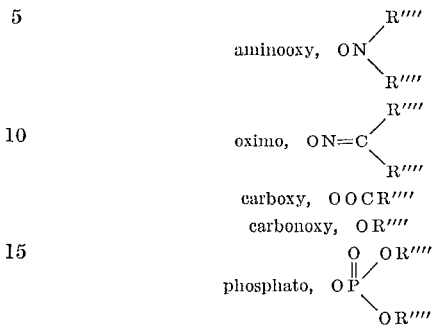

groups. The groups represented by R″″, which may be the same or different, are monovalent hydrocarbon radicals and halogenated monovalent hydrocarbon radicals. Suitable examples of aminooxy groups are dimethylaminooxy, diethyaminooxy; dibutylaminooxy, dioctylaminooxy, diphenylaminooxy, ethylmethylaminoory, ethylphenylaminooxy; oximo groups such as acetophenoximo, acetoximo, benzophenoximo, 2-butanoximo, diisopropylketoximo, chlorocyclohexanoximo; carboxy groups such as acetoyloxy, propionyloxy, valeryloxy, carpoyloxy, myristoyloxy, steroyloxy and the like. Other hydrolyzable groups are carbonoxy groups such as methoxy, butoxy, heptoxy, octoxy, phenoxy and the like. Examples of phosphato groups are dimethylphosphato, diethylphosphato, dibutylphosphato, dioctylphosphato, methylethylphosphato, methylphenylphosphato, diphenylphosphato and the like.

The modified organopolysiloxanes are prepared from organopolysiloxanes having the following formula:

wherein R′ and x are the same as those represented above.

The modified organopolysiloxanes consist of organosilicon polymers having attached thereto at least one or more side chains or branches consisting of a carbon-to-carbon chain polymer. In the formation of these polymers, hydrogen is abstracted from the organosilicon polymer by free-radical initiator to form an active site for grafting the carbon polymer thereto.

Any organosilicon polymer may be used in this invention since these polymers are apparently capable of producing some free radicals or active sites under the proper conditions. However, the polymer should be one which is capable of producing a substantial and recognizable number of free radicals and it should be substantially free of any tendency to undergo further polymerization under the conditions employed. Thus, the polymer should be one which is substantially free of any aliphatic unsaturation; however, a low degree of any such unsaturation does not preclude the desired reaction. It is preferred that the organosilicon polymer have lower alkyl groups attached to the silicon atoms since these are more amenable to hydrogen abstraction than other radicals.

Examples of suitable organosilicon polymers and copolymers which may be used in the formation of the modified polymers are hydroxyl-terminated siloxane fluids (OH-fluids), methylphenyl fluids, methylvinyl fluids and copolymers of dimethylsiloxane and phenyl-, methyl- or diphenylsiloxane units.

Any polymerizable organic monomer having aliphatic olefinic bonds may be grafted to the organosilicon polymer. Examples of suitable olefinic compounds are monomers and low molecular weight straight-chained hydrocarbons such as ethylene, propylene, butylene; vinyl halides such as vinylchloride, vinyl-fluoride; vinyl esters of organic acids such as vinyl acetate, styrene, ring-substituted styrene and other vinyl aromatics such as vinyl pyridine and vinyl naphthylene; acrylic acid and derivatives of acrylic acid including the salts, esters, amides and acrylonitriles; η-vinyl compounds such as η-vinyl carbazole, n-vinyl pyrrolidone and n-vinyl caprolactum and vinylsilicon compounds such as vinyltriethoxysilane.

Di-substituted ethylenes of the type $CH_2=CX_2$ may be used including vinylidene fluoride, vinylidene chloride, vinylidene cyanide, methacrylic acid and compounds derived therefrom such as salts, esters and amides as well as methacrolein, methacrylonitrile and the like.

Examples of di-substituted ethylenes of the type $CHX=CHX$ such as vinylene carbonate and various monomers which polymerize best in the presence of other monomers, e.g. maleic anhydride, esters of maleic and fumeric acids, stilbene, indene and coumarone may be used in the formation of these modified polymers. As before indicated, the monomers may be used singly or in combinations of two or three or even more.

The grafting operation is most expeditiously effected by using a free-radical initiator, normally organic peroxides, although other free-radical initiators such as azo-compounds in which both the N atoms of the azo linkage are attached to a tertiary-carbon atom and the remaining valences of the tertiary-carbon atom are satisfied by nitrile, carboxyalkyl, cycloalkylene, or alkyl radicals, preferably having from 1 to 18 carbon atoms. In addition to the above mentioned initiators, radiation may also be used to bring about the formation of free radicals.

The most suitable peroxide initiators are hydroperoxides such as t-butyl hydroperoxide, cumene hydroperoxide, decylene hydroperoxide; dialkyl peroxides such as di-t-butyl and dicumyl peroxides; cyclic peroxides such as 1,5-dimethylhexane-1,5-peroxide and peresters such as t-butyl perbenzoate, t-butylperoxy isopropyl carbonate, and t-butyl peroctoate.

The amount of free-radical initiator used is not critical and thus, any amount capable of producing a perceptible degree of grafting is suitable. Generally, as low as 0.05 percent of the more active peroxide initiator based on the weight of the monomer is adequate in most cases.

Although the temperature employed in the grafting step is not critical, it has been found that temperatures from about 20° to about 160° C. are suitable for grafting hydrocarbons to the organosilicon polymer.

Figure 2:
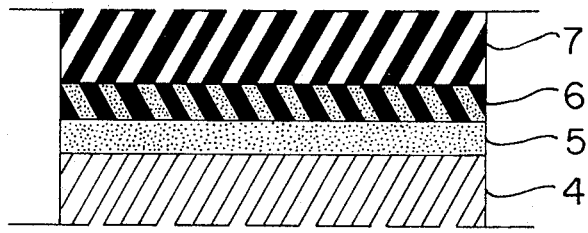
FIG. 2 represents a side elevational view of a curable modified organopolysiloxane assembly having a layer of a zinc dust primer and a layer of a curable organopolysiloxane interposed between the curable modified organopolysiloxane and substrate.

Before applying the present compositions of this invention to metal substrates, it is preferred that the substrates be cleaned and free from loose oxide scale. This may be accomplished by a wide variety of ways well known to those skilled in the art. For example, the surface may first be degreased as by dipping the substrate in a degreasing solution or by subjecting the article to vaporized degreasing materials such as trichloroethylene. Following the degreasing operation, the metal article may be further cleaned as by blasting the surface with conventional materials such as steel, shot, grit, sand or the like. As mentioned previously, the primer composition is applied to the surface by spraying, dipping, brushing or wiping and cured at any temperature of from about 50° to about 450° C. An organopolysiloxane which is curable at ambient moisture is then applied to the coated substrate. The modified organopolysiloxane which is curable at ambient moisture may be applied immediately over the layer of organopolysiloxane and both layers cured simultaneously. This provides a structure illustrated in FIG. 2 where 4 is a substrate, 7 is a curable modified organopolysiloxane and 5 and 6 are layers consisting of zinc dust primer and an organopolysiloxane, respectively, the layers being interposed between the substrate 4 and the modified organopolysiloxane 7.

The organopolysiloxane compositions may be cured by reacting hydroxyl-terminated organopolysiloxanes with a silane of the formula:

$$X_{4-t}SiY_t$$

wherein X is a relative inert group such as an alkyl, alkoxy or aryl group; Y is an acyloxy, oximo, alkoxy, aminooxy, halogen or phosphato group and $t$ is an integer of from 3 to 4. The hydroxyl groups are replaced by polyfunctional groups of the type:

$$OSiX_{4-t}Y_{t-1}$$

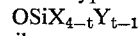

Examples of these silanes are:

methyltriacetoxysilane,
isopropoxytriacetoxysilane,
methyltriacetoximosilane,
methyltris(diethylaminooxy)silane,
methyltris(diethylphosphato)silane and the like.

Generally, the silane curing agent is added to the hydroxyl-terminated organopolysiloxane, whereby the hydroxyl groups are converted to functional groups which are hydrolyzable at ambient moisture. These compositions may be cured by merely exposing them to atmospheric moisture with or without any additional water vapor.

In addition, the hydroxyl-terminated organopolysiloxanes may be cured by reacting these organopolysiloxanes in the presence of catalysts and curing agents such as polyalkoxysilanes of the formula:

$$(X'O)_zSi(Y')_{4-z}$$

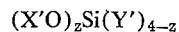

or polyalkoxysiloxanes in which the silicon atoms are linked through Si—O—Si bonds and the remaining valences of the silicon atoms are satisfied by X'O and/or Y' to form compositions which are curable at ambient moisture.

In the above formula, the groups represented by X' are monovalent hydrocarbon radicals having less than 8 carbon atoms while represented by Y' are monovalent hydrocarbon radicals or halogenated monovalent hydrocarbon radicals of less than 8 carbon atoms and $z$ has a value of from 3 to 4. Examples of monovalent hydrocarbon radicals represented by X' are methyl, ethyl, propyl, butyl, hexyl, octyl, phenyl, vinyl, allyl, ethylallyl, butadienyl and the like. Radicals represented by Y' may be the same as the radicals represented by R" above, as well as the corresponding halogenated groups such as choromethyl, 2-bromo-4,6-diiodophenyl, 1,2-fluorovinyl, 3,4-difluorocyclopentyl, 2-bromocyclopentene-2,3-yl and 6-chlorohexyl. The polyalkoxysilanes employed herein include monoorganotrihydrocarbonoxysilanes, tetrahydrocarbonoxysilanes, e.g., orthosilicate and partial hydrolyzates, of such silanes. The polyalkoxy compounds, e.g., ethyl orthosilicate or partially hydrolyzed ethyl silicates such as ethyl silicate "40," which consists primarily of decaethyl tetrasilicate, are repressensentative of these compounds. Examples of other operative alkyl silicates are ethyltrimethoxysilane, methylbutoxydiethoxysilane, propyltripropoxysilane, methyltriethoxysilane, ethyltriethoxysilane, ethyl orthosilicate and n-butyl orthosilicate. Examples of alkylpolysilicates are ethylpolysilicate, isopropylpolysilicate and butylpolysilicate, dimethyltetraethoxydisiloxane, trimethylpentabutoxytrisiloxane and the like.

The polyalkoxysilanes and polyalkoxysiloxanes employed herein may be used either alone or in combination and should be used in a proportion of from about 0.5 to about 10 percent, preferably from about 1 to 5 percent weight based on the weight of the organopolysiloxane. If the total weight of the polyalkoxysilanes or polyalkoxysiloxanes is below about 0.5 percent based on the weight of the organopolysiloxane, very little cross-linking occurs. If, on the other hand, the total weight of the polyalkoxysilanes or polyalkoxysiloxanes is above about 10 percent based on the weight of the organopolysiloxane, the curing time will not be substantially reduced; however, a large excess of cross-linking agent will insure complete reaction of all the silicon bonded hydroxyl groups.

As mentioned heretofore, compositions are cured by mixing the hydroxyl-terminated organopolysiloxanes with the polyalkoxysilane or polyalkoxysiloxane in the presence of a curing catalyst. Examples of suitable catalysts are the metal salts of carboxylic acids which include carboxylic acid salts of lead, tin, zirconium, iron, cadmium, titanium, calcium and maganese. It is preferred that the carboxylic acid salts of the above metals be characterized by the properties that the carboxylic acid radical contain less than 14 carbon atoms and preferably from 3 to 14 carbon atoms. Also, it is preferred that the salt be soluble in the organopolysiloxanes, although insoluble salts can be employed if they are properly dispersed in the system. Typical of the metal salts of carboxylic acids which are operative are the naphthenates, propenates, butyrates, hexanates, oleates, benzoates, laurates, linolates, stearates and octoates of the above metals. Also, tin compounds such as bis(acetoxybutylphenyltin)oxide, bis(acetoxydibutyltin)oxide, bis(dimethyloctyltin)oxide, bis(tribenzyltin)oxide, bis(tributyltin)oxide, benzylbutylphenyltin hydroxide, di-tertiarybutylchlorotin hydroxide and the like may be used as curing catalysts. These catalysts may be dispersed in an inert solvent and then added to the organopolysiloxane or they may be dispersed on a filler and thereafter milled with the organopolysiloxane. Examples of suitable hydrocarbon solvents are benzene, toluene, xylene and the like; halogenated hydrocarbons such as perchloroethylene or chlorobenzene; organic ethers such as diethyl ether, dibutyl ether and the like or fluid hydroxyl-free polysiloxanes. It is preferred that the solvents be of sufficient volatility to vaporize off at a very low temperature.

The catalysts used in these curing systems are effective in minimal amounts, e.g. from about 0.05 to about 2.0 percent, preferably from about 0.1 to about 1.0 percent by weight based on the weight of the composition. A mixture of two or more of the catalysts may be used, if desired. The amount of catalyst added to the commission is determined primarily by the pot-life or working time required.

The organopolysiloxane compositions may be compounded in the usual manner for preparing conventional siloxane elastomers, however, before the materials are stored prior to use, it is essential that the catalyst or curing agent such as the polyalkoxysilane or polyalkoxysiloxane be stored separately. In other words, the hydroxyl-terminated organopolysiloxane, curing agent and filler, where desired, may be compounded and the catalyst added just prior to use. In another method, the organopolysiloxane, catalyst and filler, where desired, may be compounded and then the curing agent added just prior to use. If an inert filler is used, it may be added either to the organopolysiloxane or the curing agent prior to the addition of the catalyst or immediately after the reactants have been combined.

Upon mixing the ingredients, the composition cures spontaneously in the presence of atmospheric moisture at room temperature to form an elastomeric material.

Although it is not essential, often times it is preferred that fillers be incorporated in these compositions in order to impart desirable physical properties. Examples of suitable fillers are coarse silicas such as diatomaceous earth, crushed quartz and the like. Other fillers may be used such as titanium oxide, ferric oxide, zinc oxide and fibrous fillers such as asbestos, fibrous glass and the like. Other additives such as pigments, antioxidants, ultra-violet absorbents and the like may be included in these compositions.

The method of this invention can be employed to produce a wide range of products including silicone rubber coated metals for such uses as duct work in airplanes, as dampers in sonar devices and as protective coatings of silicone rubber on plastic sheets and films. In addition, metals may be coated, laminated and bonded together with silicone rubber by the method of this invention.

The embodiments of this invention are further illustrated by the following examples in which all parts are by weight unless otherwise specified.

EXAMPLE 1

To a mixture consisting of about 50.6 parts of anhydrous ethylene glycol monoethyl ether and about 45 parts of ethyl polysilicate "40" is added about 3.4 parts of a 1.5 percent hydrochloric acid solution in distilled water and allowed to stand for about 24 hours.

To about 60 parts of the mixture prepared above is added about 40 parts of zinc dust having a particle size of from about 2 to 6 microns. The dispersion is applied by brushing to a metal substrate and dried for about 24 hours.

EXAMPLE 2

Modified organopolysiloxanes are prepared by grafting olefinic compounds to hydroxyl-terminated organopolysiloxanes in the presence of a free-radical initiator at a temperature of from about 60° to about 190° C. The unreacted olefinic compounds are removed at an elevated temperature by applying a vacuum of about 1 mm. Hg or less while continuing to heat for an additional hour. Several modified organopolysiloxanes prepared in accordance with this procedure are illustrated in Table I.

TABLE I

| Example No. | Olefinic compound | | Hydroxylated fluid | | Free-radical initiator | | Reaction conditions | | Final polymer, viscosity, cs. |
|---|---|---|---|---|---|---|---|---|---|
| | Type | Parts | Viscosity, cs. | Parts | Type | Parts | Temp., °C. | Time, hr. | |
| 2(a) | Acrylonitrile | 14.6 | 1,900 | 50 | t-BP | 0.50 | 80 | 1.5 | 14,000 |
| | Butyl acrylate | 35.4 | | | | | | | |
| 2(b) | Acrylonitrile | 9.0 | 800 | 40 | t-BP | 0.50 | 80 | 1.7 | 7,800 |
| | Butyl acrylate | 51.0 | | | | | | | |
| 2(c) | Acrylonitrile | 9.1 | 800 | 40 | t-BP | 0.25 | 80 | 2.0 | 20,200 |
| | Ethyl acrylate | 2.9 | | | | | | | |
| | Butyl acrylate | 48.0 | | | | | | | |
| 2(d) | Methacylate | 50.0 | 400 | 50 | t-BP | 0.50 | 80 | 4.0 | 15,500 |
| 2(e) | Lauryl methacrylate | 70.0 | 400 | 30 | t-BP | 0.50 | 80 | 5.0 | 19,400 |
| 2(f) | Styrene | 250.0 | 610 | 304 | t-BP | 2.00 | 125 | 24.0 | 14,500 |
| | Butyl acrylate | 204.0 | | | | | | | |
| 2(g) | Vinyl chloride | 45.0 | 6,700 | 350 | t-BPer | 1.80 | 80 | 4.0 | 17,800 |

Note: t-BP=Tertiary-butyl peroxide; t-BPer=Tertiary-butyl peroctoate.

EXAMPLE 3

Metal substrates primed with the composition of Example 1 are coated with a film of a room temperature curable organopolysiloxane composition prepared by mixing 5 parts of methyltriacetoxysilane with about 100 parts of a hydroxyl-terminated polydimethylsiloxane having a viscosity of about 1,500 cs. and about 8 parts of Cab—O—Sil To this layer is applied a composition consisting of about 100 parts of a curable modified organopolysiloxane prepared in accordance with the procedure described in Example 2 and containing about 5 parts of ethyl orthosilicate and about 0.5 part of dibutyltin dilaurate. The organopolysiloxane layers are cured at room temperature for 7 days.

In similar experiments, the curable modified organopolysiloxane containing about 5 parts of ethyl orthosilicate and about 0.5 part of dibutyltin dilaurate per 100 parts of the modified organopolysiloxane prepared in accordance with the procedure described in Example 2 are applied to metal substrates containing a coating of zinc dust and also to untreated metal substrates.

The results of the above experiments are illustrated in Table II.

TABLE II

| | | Adhesion of modified organopolysiloxanes to substrates | | |
|---|---|---|---|---|
| Metal substrate | Modified siloxane*, Ex. No. | Untreated | Zinc dust coating | Overlayer of siloxane* on zinc dust coating |
| Steel, SAE 1020 | 2(a) | None | Fair | Excellent. |
| | 2(b) | ...do | ...do | Do. |
| Stainless steel Type 304 | 2(a) | ...do | ...do | Good. |
| | 2(c) | ...do | ...do | Do. |
| Copper | 2(d) | ...do | ...do | Do. |
| | 2(f) | ...do | ...do | Do. |
| Brass | 2(a) | ...do | ...do | Excelleent. |
| | 2(c) | ...do | ...do | Do. |
| Aluminum Type 7075 | 2(e) | ...do | ...do | Good. |
| | 2(f) | ...do | ...do | Do. |
| Titanium No. 811 | 2(g) | ...do | ...do | Do. |
| | 2(b) | ...do | ...do | Do. |

*Organopolysiloxane.

EXAMPLE 4

Metal substrates primed with the composition of Example 1 are coated with a thin layer of a curable organopolysiloxane composition prepared by mixing 5 parts of methyltriacetoxysilane with about 100 parts of a hydroxyl-terminated polydimethylsiloxane having a viscosity of about 1,500 cs. To this layer of curable organopolysiloxane is applied a coating composition consisting of about 100 parts of a hydroxyl-terminated modified organopolysiloxane prepared in accordance with the procedure described in Example 2 and containing about 5 parts of methyltriacetoxysilane and 0.5 part of dibutyltin butoxychloride. The organopolysiloxane layers are cured for 7 days at room temperature.

In a comparative test, the modified organopolysiloxanes prepared above are applied to untreated metal substrates and cured for 7 days at room temperature. The results of these tests are illustrated in Table III.

TABLE III

| | | Adhesion of modified organopolysiloxanes to substrates | |
|---|---|---|---|
| Metal substrate | Modified siloxane*, Ex No. | Untreated | Overlayer of siloxane* on zinc dust coating |
| Steel, SAE 1020 | 2(a) | None | Excellent. |
| | 2(c) | ...do | Do. |
| | 2(d) | ...do | Do. |
| Stainless steel Type 304 | 2(b) | ...do | Good. |
| | 2(c) | ...do | Do. |
| | 2(d) | ...do | Do. |
| Copper | 2(e) | ...do | Do. |
| | 2(f) | ...do | Do. |
| | 2(g) | ...do | Do. |
| Brass | 2(b) | ...do | Excellent. |
| | 2(c) | ...do | Do. |
| | 2(d) | ...do | Do. |
| Aluminum Type 7075 | 2(a) | ...do | Good. |
| | 2(b) | ...do | Do. |
| | 2(c) | ...do | Do. |
| Titanium No. 811 | 2(a) | ...do | Do. |
| | 2(b) | ...do | Do. |
| | 2(c) | ...do | Do. |

*Organopolysiloxane.

EXAMPLE 5

Metal substrates primed with the composition prepared in accordance with the procedure of Example 1 are coated with a thin layer of hydroxyl-terminated polydimethylsiloxane composition prepared by mixing 5 parts of ethyl orthosilicate and about 0.5 part of dibutyltin dilaurate with about 100 parts of the polydimethylsiloxane having a viscosity of about 1,500 cs. To this layer is applied a modified organopolysiloxane composition comprising about 100 parts of hydroxyl-terminated organopolysiloxane and about 5 parts of various organosilanes. The organopolysiloxane layers are cured for 7 days at room temperature.

In similar experiments, the modified organopolysiloxane containing the various organosilanes are applied to untreated metal substrates and cured for the same period of time.

The results of these tests are illustrated in Table IV.

TABLE IV

| | | | Adhesion of modified organopolysiloxanes to substrates | |
|---|---|---|---|---|
| Metal substrate | Modified siloxane* Ex. No. | Curing agent | Untreated | Overlayer of siloxane* on zinc dust coating |
| Steel, SAE 1020 | 2(b) | Methyltriacetoxysilane | None | Excellent. |
| | 2(c) | Ethyltriacetoxysilane | ...do | Do. |
| Stainless steel Type 304 | 2(d) | Methyltripropionyloxysilane | ...do | Do. |
| | 2(e) | Ethyltripropionyloxysilane | ...do | Do. |
| Copper | 2(f) | Butyltriacetoxysilane | ...do | Do. |
| | 2(g) | Methyltris-diethylaminooxysilane | ...do | Good. |
| Brass | 2(a) | Methyltris (diethylphosphato) silane | ...do | Excellent. |
| | 2(c) | Methoxytriacetoxysilane | ...do | Do. |
| Aluminum Type 7075 | 2(d) | Ethoxytriacetoxysilane | ...do | Do. |
| | 2(f) | Methyltriacetoximosilane | ...do | Good. |
| Titanium No. 811 | 2(f) | Phenyltriacetoxysilane | ...do | Do. |
| | 2(g) | Phenyltris (diethylphosphato) silane | ...do | Do. |

*Organopolysiloxane.

EXAMPLE 6

Metal substrates primed with the composition prepared in accordance with Example 1 are coated with a thin layer of an organopolysiloxane composition prepared by mixing about 5 parts of ethyl orthosilicate in about 0.5 part of dibutyltin dilaurate with about 100 parts of a hydroxyl-terminated polydimethylsiloxane having a viscosity of about 1,500 cs. To this layer is applied a modified organopolysiloxane composition consisting of about 5 parts of ethyl orthosilicate, about 0.5 part of dibutyltin butoxychloride and about 100 parts of a modified hydroxyl-terminated polydimethylsiloxane prepared in accordance with the procedure described in Example 2. The organopolysiloxane layers are cured for 7 days at room temperature.

In similar experiments, the modified organopolysiloxanes prepared in accordance with the procedure described in Example 2 are applied to untreated metal substrates and cured for similar period of time. The results of these tests are illustrated in Table V.

TABLE V

| Metal substrate | Modified siloxane*, Ex. No. | Adhesion of modified organopolysiloxanes to substrates | |
|---|---|---|---|
| | | Untreated | Overlayer of siloxane* on zinc dust coating |
| Steel, SAE 1020 | 2(a) | None | Excellent. |
| | 2(b) | do | Do. |
| Stainless steel Type 304 | 2(c) | do | Do. |
| | 2(d) | do | Do. |
| Copper | 2(e) | do | Good. |
| | 2(f) | do | Do. |
| Brass | 2(g) | do | Excellent. |
| | 2(h) | do | Do |
| Aluminum Type 7075 | 2(c) | do | Good. |
| | 2(d) | do | Do. |
| Titanium No. 811 | 2(e) | do | Do. |
| | 2(a) | do | Do. |

*Organopolysiloxanes.

When the above examples are repeated utilizing other hydroxyl-terminated modified organopolysiloxanes in the presence of other catalysts, compositions are obtained which have substantially the same adhesion properties.

Although specific examples of the invention have been described, it is not intended to limit the invention solely thereto but to include all the variations and modifications falling within the spirit and scope of the appended claims.

What is claimed is:

1. A method for bonding silicone rubber to a metal substrate which comprises applying to the surface of the substrate a primer composition comprising particulate zinc in an amount of from about 10 to about 90 percent based on the weight of the primer composition and a condensate obtained from a tetraalkoxysilane represented by the formula:

$$\text{RO}-\underset{\underset{\text{OR}}{|}}{\overset{\overset{\text{OR}}{|}}{\text{Si}}}-\text{OR}$$

in which R represents a straight-chain alkyl radical of not more than 4 carbon atoms, said condensate having an $SiO_2$ content upwards of 35 percent, water in an amount sufficient to provide 0.15 to 0.5 mole of $H_2O$ for each alkoxy group carried by said condensate and a solvent from the class consisting of monoalkylene glycol monoalkyl ethers, dialkylene glycol monoalkyl ethers, dialkylene glycol dialkyl ethers and monoalkylene glycol diakyl ethers having boiling points within the range of 121° C. to 150° C. and flash points within the range of 46° C., to about 74° C., the solvent condensate ratio on a weight basis lying within the limits of 0.5:1 to 10:1, drying said primer composition, coating the dried primer surface with a room temperature curable organopolysiloxane, applying a room temperature curable modified organopolysiloxane consisting of an organosilicon polymer having attached thereto at least one side chain of a carbon-to-carbon polymer derived from a polymerizable organic monomer having aliphatic olefinic bonds to said organopolysiloxane coating and thereafter allowing said curable organopolysiloxane and modified organopolysiloxane to cure.

2. The method of claim 1 wherein the primer composition is dried at a temperature of from about 50° C. up to about 450° C.

3. The method of claim 1 wherein said curable organopolysiloxane conforms to the formula:

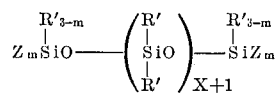

wherein R' is selected from the group consisting of monovalent hydrocarbon radicals, halogenated monovalent hydrocarbon radicals and cyanoalkyl radicals; Z is selected from the class consisting of hydroxyl and hydrolyzable groups; m is an integer of from 1 to 3 and x is an integer of from 0 to 20,000.

4. The method of claim 3 wherein Z is a hydrolyzable group.

5. The method of claim 3 wherein Z is a hydroxyl group and said curable organopolysiloxane further contains a curing agent selected from the group consisting of polyalkoxysilanes and polyalkoxysiloxanes and a catalytic amount of a metal salt of a carboxylic acid.

6. The method of claim 5 wherein said curable organopolysiloxane is reacted with a silane conforming to the formula:

$$X_{4-t}SiY_t$$

wherein X is a group selected from the class consisting of alkyl, alkoxy or aryl groups; Y is selected from the class consisting of alkoxy, acyloxy, oximo, aminooxy, halogen or phosphato groups and t is an integer of from 3 to 4.

7. The method of claim 6 wherein the silane is a methyltriacetoxysilane.

8. The method of claim 5 wherein the curing agent is ethyl silicate and the catalyst is dibutyltin butoxychloride.

9. The method of claim 1 wherein the modified organopolysiloxane conforms to the formula:

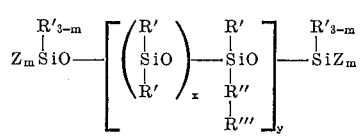

in which R' is selected from the group consisting of monovalent hydrocarbon radicals, halogenated monovalent hydrocarbon radicals and cyanoalkyl radicals; R″ is a divalent hydrocarbon radical; R‴ is a polymeric organic radical linked to R″ by a carbon-to-carbon linkage; Z is selected from the class consisting of hydroxyl and hydrolyzable groups; m is an integer of from 1 to 3; x is an integer of from 0 to 20,000 and y is an integer of from 1 to 500.

10. The method of claim 9 wherein Z is a hydroxyl group and the curable modified organopolysiloxane further contains a curing agent selected from the group consisting of polyalkoxysilanes and polyalkoxysiloxanes and a catalytic amount of a metal salt of a carboxylic acid.

11. The method of claim 10 wherein the modified organopolysiloxane is reacted with a silane conforming to the formula:

$$X_{4-t}SiY_t$$

in which X is selected from the class consisting of alkyl, alkoxy or aryl groups; Y is selected from the class consisting of acyloxy, oximo, alkoxy, aminooxy, halogen and phosphato groups and t is an integer of from 3 to 4.

12. The method of claim 11 wherein the silane is methyltriacetoxysilane.

13. The method of claim 10 wherein the curing agent is ethyl silicate and the catalyst is dibutyltin butoxychloride.

14. An article of manufacture having silicone rubber bonded to a substrate which comprises a metal substrate, a room-temperature-cured modified organopolysiloxane consisting of an organosilicon polymer having attached thereto at least one side chain of a carbon-to-carbon polymer derived from a polymerizable organic monomer having aliphatic olefinic bonds and having interposed between the substrate and the modified organopolysiloxane, a primer composition bonded to said substrate comprising a dried residue of particulate zinc in an amount of from about 10 to about 90 percent base on the weight of the primer composition and a condensate obtained from a tetraalkoxysilane represented by the formula:

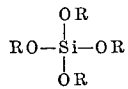

in which R represents a straight-chain alkyl radical of not more than 4 carbon atoms, and having an $SiO_2$ content upwards of 35 percent, and a layer of cured organopolysiloxane bonded to said primer.

References Cited

UNITED STATES PATENTS 3,108,898 10/1963 Nitzsche et al. _____ 117—75
2,686,654 8/1954 Roush _____ 117—75
3,377,309 4/1968 Harper _____ 161—206

WILLIAM D. MARTIN, Primary Examiner

R. HUSACK, Assistant Examiner

U.S. Cl. X.R.

117—49, 72, 75, 76, 132, 135.1; 161—207; 260—824